United States Patent [19]

Vredenburg, Sr.

[11] 4,188,718
[45] Feb. 19, 1980

[54] TREE GIRDLING DEVICE

[76] Inventor: Edric W. Vredenburg, Sr., P.O. Box 135, Fortine, Mont. 59918

[21] Appl. No.: 949,811

[22] Filed: Oct. 10, 1978

[51] Int. Cl.² .............................................. A01G 3/03
[52] U.S. Cl. ...................................... 30/121; 30/280
[58] Field of Search ......................... 30/121, 280, 317

[56] References Cited

U.S. PATENT DOCUMENTS

| | | | |
|---|---|---|---|
| 278,686 | 6/1883 | Daigneau | 30/280 |
| 973,494 | 10/1910 | Friedlund | 30/121 |
| 2,552,652 | 5/1951 | Stasiek | 30/121 |
| 2,725,674 | 12/1955 | Burney | 30/121 |
| 2,848,841 | 8/1958 | Kuts | 30/121 |
| 2,870,572 | 1/1959 | Grissett | 30/121 |

FOREIGN PATENT DOCUMENTS

| | | | |
|---|---|---|---|
| 455265 | 3/1949 | Canada | 30/121 |
| 419202 | 12/1971 | U.S.S.R. | 30/121 |

OTHER PUBLICATIONS

I. S. Marchenko, "New Girdling Tool for Brush Management in Mixed Forests" (no date given by applicant) (pp. 61-62).

*Primary Examiner*—Othell M. Simpson
*Assistant Examiner*—J. T. Zatarga
*Attorney, Agent, or Firm*—Robert H. Eckhoff

[57] ABSTRACT

A readily and easily manipulatable tree girdling device is provided which effectively removes a complete circular band of bark and all that underlies the bark to the central portion of the tree so that fluid cannot pass from the root system of the tree to the upper portion of the tree whereby with the elimination of such fluid transmission the tree dies. This operation is called "girdling." In many areas it is practiced widely as a method of improving the ecology of the area.

2 Claims, 14 Drawing Figures

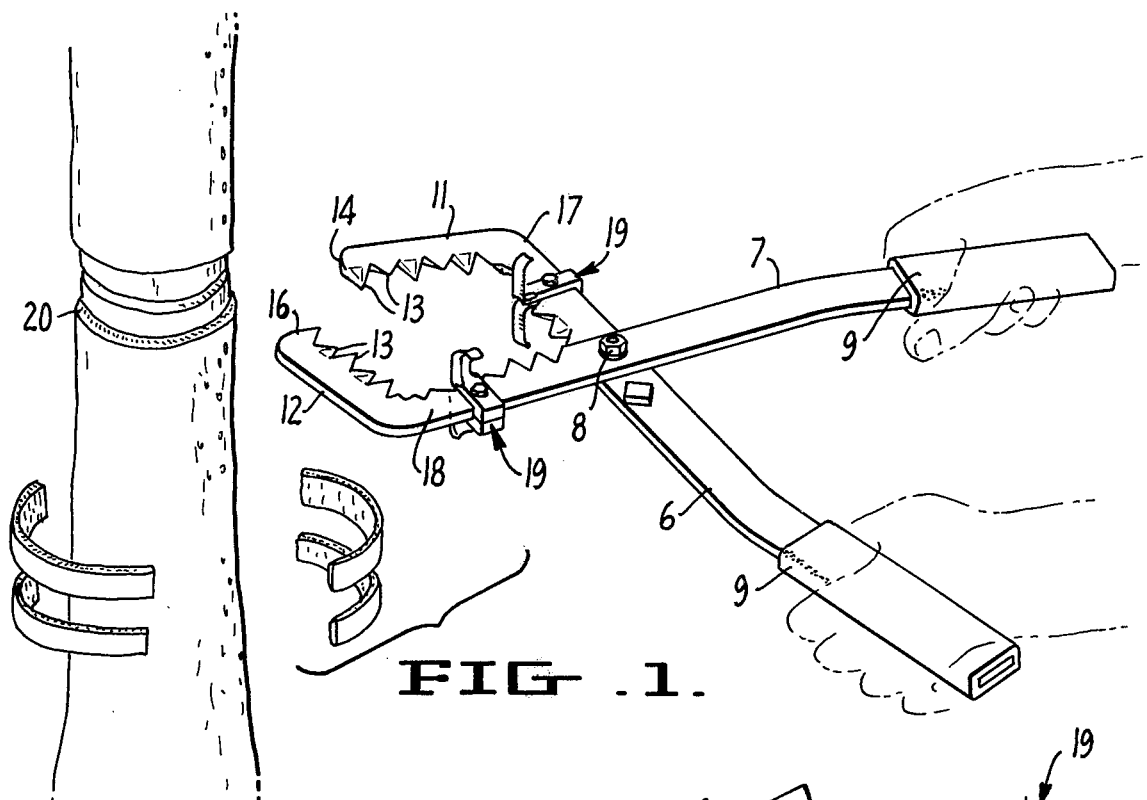
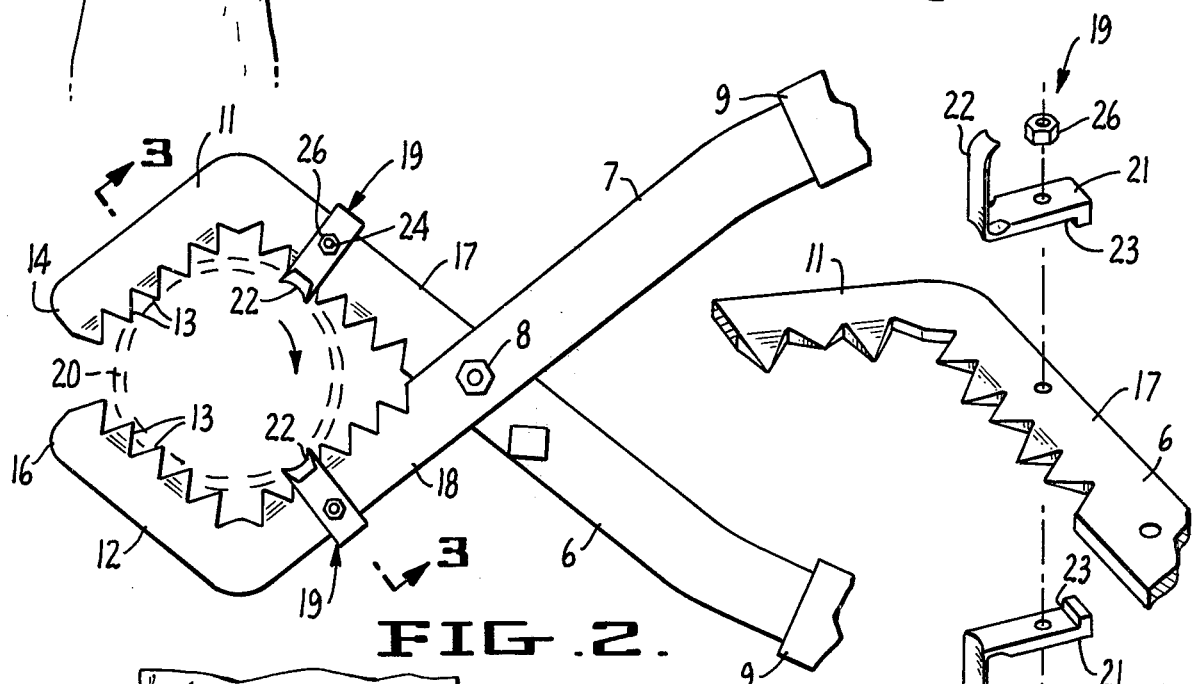
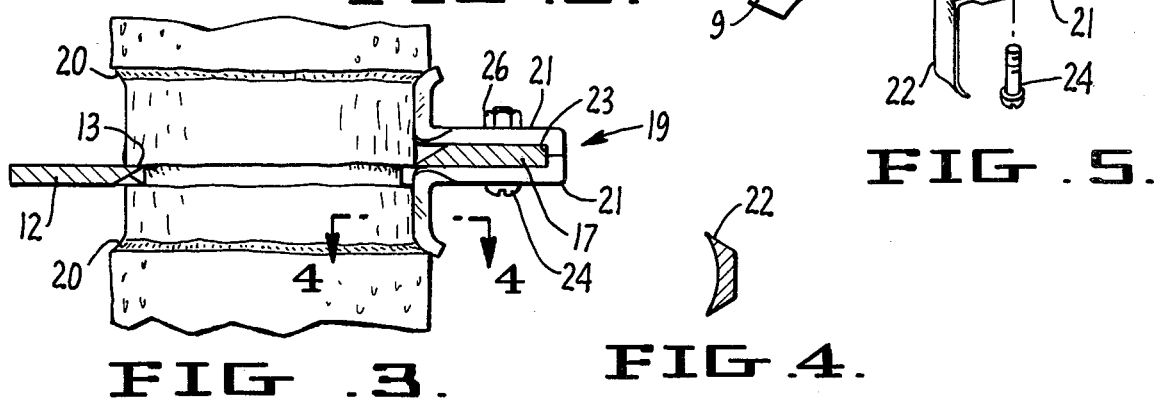

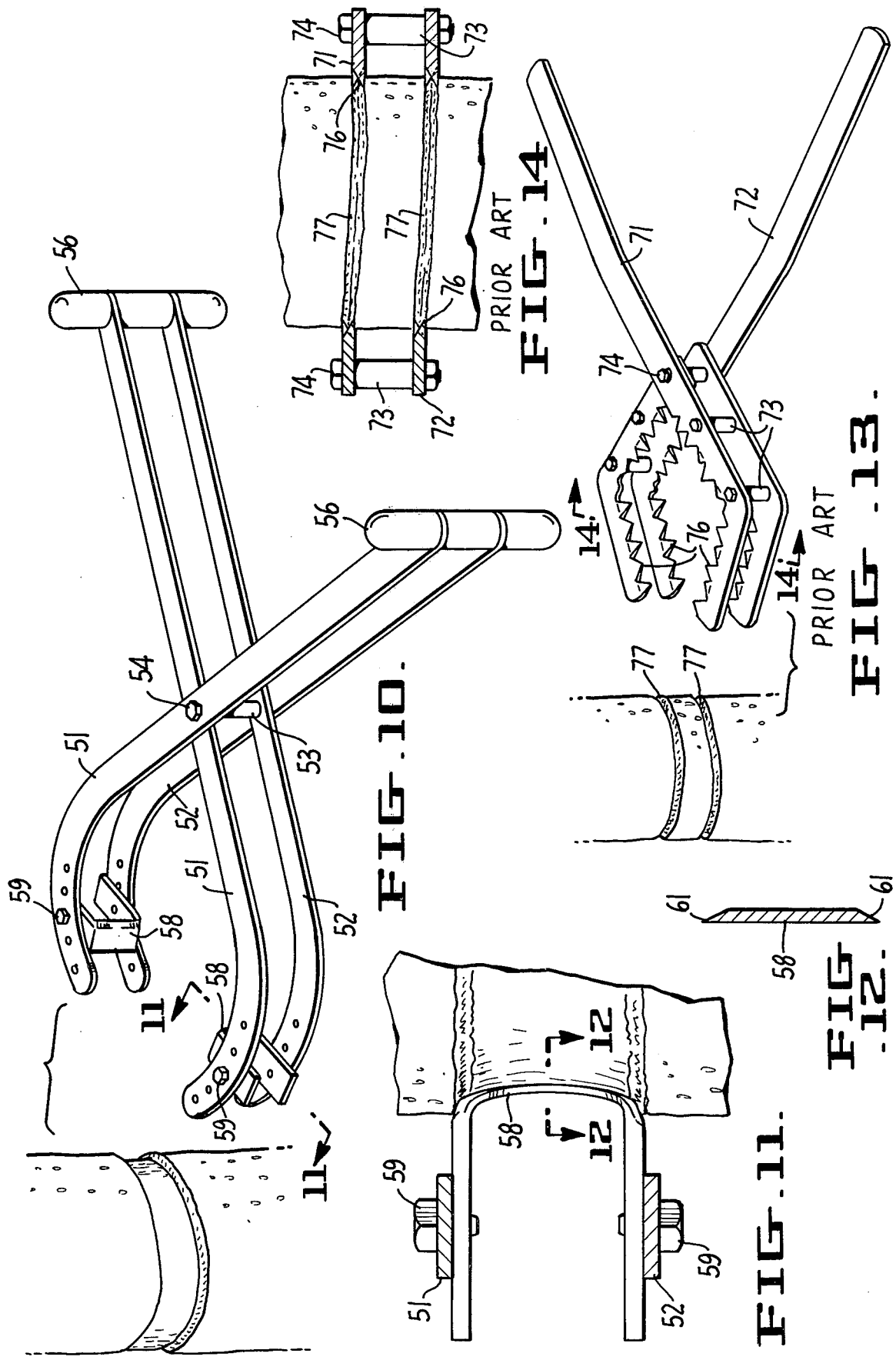

4,188,718

TREE GIRDLING DEVICE

BACKGROUND OF THE INVENTION

In many areas, tree girdling is systematically practiced to the end that the tree population in a given area can be maintained at a level most favorable to the ecology. Tree girdling has long been practiced but is usually a "hit and miss" proposition in that all of the fluid transmitting material is not removed and hence the girdling operation was ineffective.

SUMMARY OF THE INVENTION

In general it is the broad object of the present invention to provide an improved form of tree girdling device which effectively removes a complete band of all fluid transmitting material whereby fluid transmission is effectively prevented and the tree dies.

BRIEF DESCRIPTION OF THE DRAWINGS

FIG. 1 is a perspective view of one form of apparatus showing the relation to a tree which has been successfully girdled.

FIG. 2 is a plan view of the device shown in FIG. 1.

FIG. 3 is a side elevational view showing the tool of FIGS. 1 and 2 in girdling engagement with the tree.

FIG. 4 is a section taken along the line 4—4 of FIG. 3 showing the cutters used in the tool of FIGS. 1, 2 and 3. FIG. 5 is a perspective view showing the manner of assembly of the cutters on the tool of FIGS. 1-4.

FIG. 10 is a perspective view of a modified form of tool shown in relation to a girdled tree.

FIG. 11 is a section taken along the line 11—11 of the cutter mechanism of the girdling device shown in FIG. 10.

FIG. 12 is a section taken along the line 12—12 showing the arrangement of the cutter in cross section.

FIG. 13 is a perspective view of a prior art device which has been used in Russia for tree girdling as reported in the Russian article, a copy of which is filed concurrently with this application.

FIG. 14 is a section taken along the line 14—14 of FIG. 13.

DESCRIPTION OF THE PREFERRED EMBODIMENT

Figure 6:
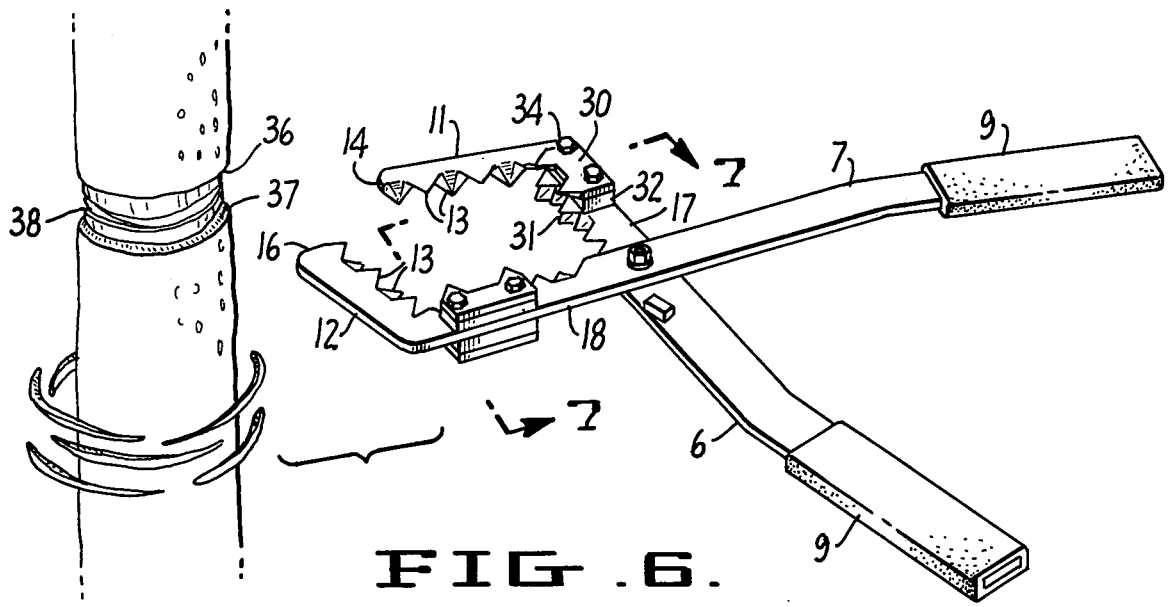
FIG. 6 is a perspective view of another form of tree girdling device shown in relation to a tree following girdling of the tree.

Referring to the drawings and particularly to FIGS. 1 through 5, the device includes opposite lever members 6 and 7 pivoted upon one another by the nut and bolt 8. Each of the levers 6 and 7 includes a handle portion 9 at one end thereof. The forward ends of the levers 6 and 7, designated as 11 and 12, each includes a plurality of teeth 13. The teeth vary in depth so that the cutting action of the teeth on the bark varies. Each of the forward ends 11 and 12 is bent upon itself to provide, respectively, a forward portion 14 and 16 and a rearward portion 17 and 18. Portions 14 and 17 and 16 and 18 provide, in effect, a receptacle so that they may be placed about a tree in an encircling manner. Each of portions 17 and 18 includes an auxiliary cutter structure, generally designated 19, and which is particularly shown in FIGS. 3, 4 and 5. Each comprises opposite cutter elements, each of which has a base 21 and an upwardly extending arcuate cutter portion 22. Each base 21 is recessed as at 23 to fit upon each of the respective elements 17 and 18 being retained in place by bolt 24 and nut 26. The auxiliary cutters 19 are placed on portions 17 and 18 so the cutters are close to the pivot bolt 8 so more force can be placed on the auxiliary cutters.

In use, an operator grasps the handles 9 and moves the handles apart at first and then retracts them into encircling engagement with the tree. Upon moving the handles toward one another, the tree is gripped and the tool is in cutting engagement with each of the teeth 13 extending into the bark. Rotation of the device about the tree causes the teeth 13 to cut through the bark 20 on the surface of the tree and permits the cutters 19 to remove the outer or cork layer of the bark on the tree. Stated differently, rotation of the device enables the cutters 19 to remove the cortical parenchyma, epidermis, pericycle and phloem, thus effectively girdling the tree. The results of effective girdling are well-known for it prevents the passage of fluid from the root system of the tree with the result that the portion of the tree above the girdle, lacking any sustaining fluid, dries and dies in the absence of the life sustaining fluid.

Figure 7:
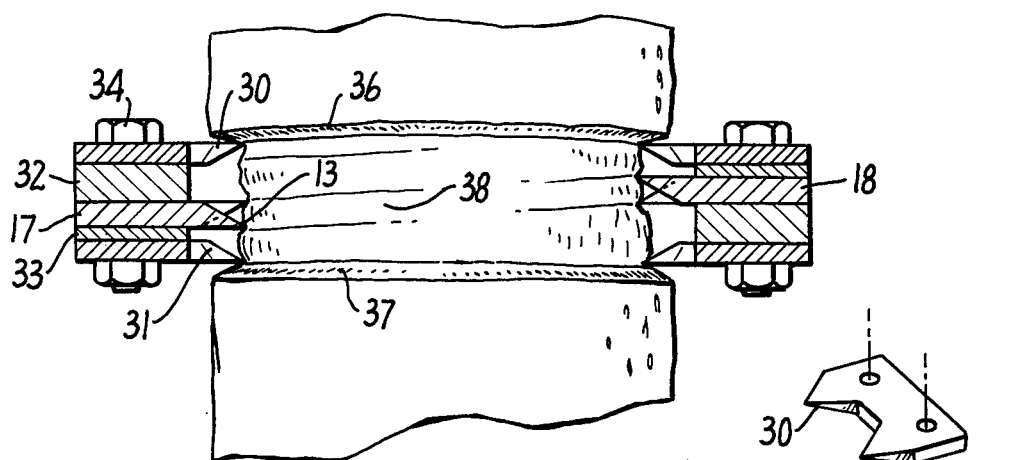
FIG. 7 is a section taken along the line 7—7 in FIG. 6.
Figure 8:
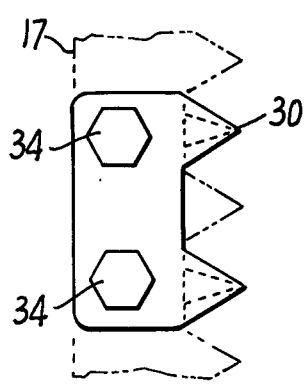
FIG. 8 is a plan view showing the attachment of auxiliary tools for extending the girdling operation.
Figure 9:
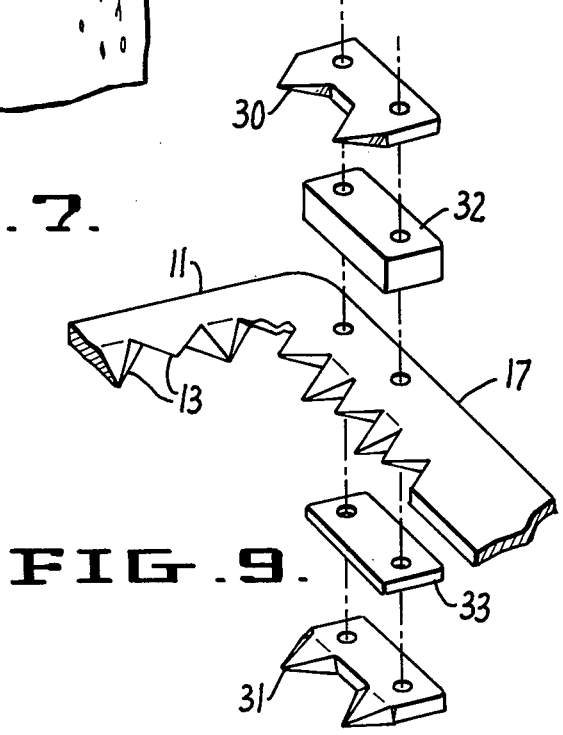
FIG. 9 is a perspective view showing the manner of assembly of the righthand portions of the tool shown in FIG. 7.

In the structure shown in FIGS. 6 through 9, each of the elements 17 and 18 is provided with a cutter mechanism comprising an upper cutter element 30 and a lower cutter element 31 mounted upon spacers 32 and 33 on opposite sides of each of the portions 17 and 18 and retained in place by a suitable nut and bolt structure 34. Each of the spaced cutter elements 30 and 31 cuts a separate circular cut, an upper and lower circular cut 36 and 37 while an intermediate cut 38 is made between cuts 36 and 37. The spacers 32 and 33 are of different thickness so that the cutters 30 and 31 are spaced properly in relation to the teeth on the portions 17 and 11.

In that form of the invention shown in FIGS. 10 through 12, two pairs of opposite arms 51 and 52 are provided and are spaced apart by a tubular support 53, the opposite arm pairs and the tubular support 53 being positioned by a nut and bolt structure 54. The opposite pairs of arms 51 and 52 have handles 56 at their respective rearward ends. At the forward end of each of the pairs of arms, I provide a U-shaped cutting element 58 each of which is held in place by studs 59. The cutters 58 are U-shaped in cross section and have opposite cutting edges 61 so that a wide band of the bark and underlying tissue is cut and thoroughly removed.

In the prior art device shown in FIGS. 13 and 14, opposite upper and lower lever arms 71 and 72 are provided and are spaced apart by the spacers 73 retained in place by nut and bolt structure 74. Each of the forward ends of the levers 71 and 72 carry two spaced rows of teeth 76. In use, however, this device merely cuts two circular grooves 77 in the bark of the tree and much of the cut material is merely bruised and is not removed from the cut so that the tree is not effectively girdled or, if it is removed, it clogs the space between the teeth so that frequent cleaning is required.

I claim:

1. A tree girdling device having a pair of levers hinged intermediate their ends and having handles at one end of each of the pair of levers for moving them about the hinge and having their other ends formed with tree encircling element, each elements having a first straight portion continuing the lever with a second terminal portion, said terminal portion being straight and extending at approximately 90° to the first portion and toward an opposite like portion on the other lever to define a bent section in each lever, said levers being joined at a pivot means, each of the portions having a plurality of teeth formed thereon for bark cutting engagement with a tree, a plurality of spaced arcuate cutters immovably mounted on opposite sides of said first straight portions between said bent section and said pivot means, each cutter having a base mounted on a surface of said first portion adjacent said teeth and extending away from said teeth and a tree engaging portion connected to said base to engage a tree at a location spaced from said teeth to form spaced upper and lower cuts in a tree spaced from and separate from an intermediate cut formed in said tree by said teeth which is located between said upper and lower cuts, said cutters being oriented in a plane which is essentially perpendicular to a plane containing said first portions and in which such first portions move.

2. A tree girdling device having a pair of levers hinged intermediate their ends and having handles at one end of each of the pair of levers for moving them about the hinge and having their other ends formed with tree encircling elements, each element having a first straight portion continuing the lever with a second terminal portion, said terminal portion being straight and extending at approximately 90° to the first portion and toward an opposite like portion on the other lever to define a bent section in each lever, said levers being joined at a pivot means, each of the portions having a plurality of teeth formed thereon for bark cutting engagement with a tree, a plurality of spaced cutters immovably mounted on opposite sides of said first straight portions between said bent section and said pivot means, each cutter having a spacer element mounted on a surface of said first portion adjacent said teeth and extending away from said teeth, each of said spacer elements having a thickness dimension extending from said first straight portion away from said first straight portion, the thickness dimension of a spacer element on one side of said first straight portion being different from the thickness dimension of a spacer element on another side of said first straight portion, said cutters each having a length shorter than the length of said first straight portions and a tree engaging portion connected to said spacer element to extend in a plane essentially parallel to a plane in which said first portions move and to engage a tree at a location spaced from said teeth to form spaced upper and lower cuts in a tree spaced from and separate from an intermediate cut formed in said tree by said teeth which is located between said upper and lower cuts.

* * * * *